(No Model.)
E. J. GOULD.
DEVICE FOR GAGING SAW TEETH.
No. 506,998. Patented Oct. 17, 1893.
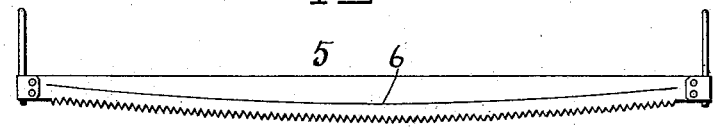
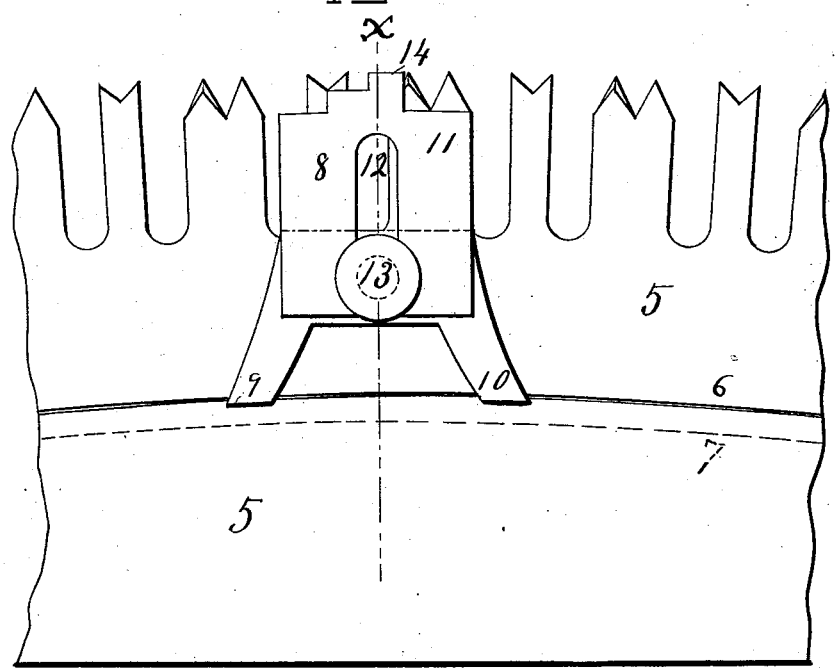
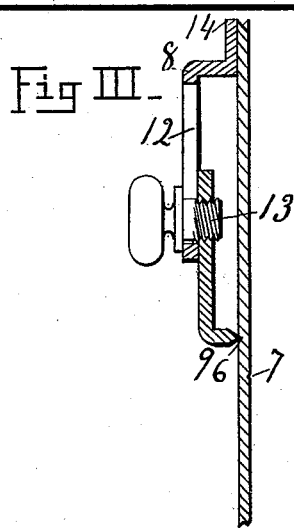
WITNESSES,
P. E. Stevens.
M. C. Hillyard.
INVENTOR.
Edward J. Gould.
By W. C. Stevens. Atty.

UNITED STATES PATENT OFFICE.

EDWARD J. GOULD, OF CEDAR HOME, WASHINGTON.

DEVICE FOR GAGING SAW-TEETH.

SPECIFICATION forming part of Letters Patent No. 506,998, dated October 17, 1893.

Application filed March 6, 1893. Serial No. 464,792. (No model.)

*To all whom it may concern:*

Be it known that I, EDWARD J. GOULD, a citizen of the United States, residing at Cedar Home, in the county of Snohomish and State of Washington, have invented certain new and useful Improvements in Devices for Gaging Saw-Teeth; and I do hereby declare the following to be a full, clear, and exact description of the invention, such as will enable others skilled in the art to which it appertains to make and use the same.

This invention relates in general to saws for cutting wood and timber, and more particularly to cross-cut saws having outwardly curved edges at the line of the teeth.

Heretofore it has been common in sharpening saws either to breast them off by sliding a file along the edge of the teeth so as to cut down the points of the long teeth to an average level with all the teeth, or to level the teeth side-by-side comparing them by the eye regardless of the original curved form of the saw. This original form has been established by saw makers as a result of long experience and it is a well known fact that new saws will do a great deal more work in a given time, and better work than the same saws will do after they have been a few times filed. To obviate these objections the object of my invention is to provide means whereby the saw may be repeatedly filed or otherwise sharpened without changing its contour or curve along the edge of the teeth.

To this end my invention consists in a saw jointly with a gage constructed as hereinafter described and claimed, reference being had to the accompanying drawings, in which—

Figure I, is a side elevation of a cross-cut saw such as is commonly worked by two men, one at each end in sawing off logs. Fig. II, represents in side elevation the midway portion of the saw on a larger scale with a gage located in position for service. Fig. III, is a cross section of the saw and gage at line *x*.

5 represents the saw-blade which may be of any form, with the contour line of its toothed edge either straight or curved outward as usual in cross cut saws.

6 and 7 represent shallow grooves in the faces of the saw at a considerable distance from the line of the edge of the teeth, and parallel with that line. These grooves are made in the saw to the best advantage while the edge of the saw is smooth, that is before the teeth are cut therein, and they should be located at a distance from the edge beyond which it is not likely that the saw will ever be worn away.

Though it is not necessarily a part of this invention I have herewith shown a gage 8 suitable to use with my guiding grooves 6 and 7. This gage is provided with two feet 9, 10, having sharp toes adapted to engage and slide lengthwise in either of the said grooves. 11 is the body of the gage vertically slotted at 12 and provided with a binding screw 13 whereby the body may be raised or lowered and fixed relatively to the feet so as to bring its upper edge 14 to the height from the gage groove at which it is desirable to leave the edges of the teeth in filing them.

It is evident that other styles of gages might be made to operate in connection with the guiding grooves 6, 7, and I do not claim the gage shown in this application. It is also evident that there might be a number of grooves 6 upon one side of the saw at greater or less distances from the edge, or a number of grooves 7 at the other side of the saw, without departing from the spirit of my invention so long as they are made parallel with the desired contour or edge line of the teeth. These gage grooves will not increase the cost of the saw at all, the expense of making them being almost nothing, and aided by them any person who can file a saw will be enabled to maintain the edge of the saw at its original curve or contour throughout the life of the saw, so that the saw will continue to work as well when old as when new if properly filed relative to this gage line.

It is evident that some advantage would be obtained by marking mere lines or scratches in any imperishable manner in place of the groove described because from this line measures might be taken to maintain the edge parallel therewith, but it would not be so mechanical nor as convenient in service as the grooves described, yet for the purposes of the claim I use the words "gage line" to mean any such line or lines whether upon the surface or grooved into the saw-blade.

Having thus fully described my invention, what I believe to be new, and desire to secure by Letters Patent, is the following:

A saw having a groove or grooves in its side or sides parallel with the teeth throughout its length jointly with a gage for the teeth adapted to engage one of the said grooves at two points some distance apart, substantially as described.

In testimony whereof I affix my signature in presence of two witnesses.

EDWARD J. GOULD.

Witnesses:
J. W. BROKAW,
H. B. BROKAW.